United States Patent
Shimizu

(10) Patent No.: US 10,031,584 B2
(45) Date of Patent: Jul. 24, 2018

(54) TACTILE SENSATION PROVIDING APPARATUS AND CONTROL METHOD OF TACTILE SENSATION PROVIDING APPARATUS

(71) Applicant: Kyocera Corporation, Kyoto (JP)

(72) Inventor: Katsuhiko Shimizu, Yamato (JP)

(73) Assignee: KYOCERA Corporation, Kyoto (JP)

( * ) Notice: Subject to any disclaimer, the term of this patent is extended or adjusted under 35 U.S.C. 154(b) by 75 days.

(21) Appl. No.: 15/031,817

(22) PCT Filed: Sep. 26, 2014

(86) PCT No.: PCT/JP2014/004941
§ 371 (c)(1),
(2) Date: Apr. 25, 2016

(87) PCT Pub. No.: WO2015/064007
PCT Pub. Date: May 7, 2015

(65) Prior Publication Data
US 2016/0246372 A1    Aug. 25, 2016

(30) Foreign Application Priority Data

Oct. 28, 2013  (JP) .................................. 2013-223276

(51) Int. Cl.
*G06F 3/01*    (2006.01)
*G06F 3/041*    (2006.01)

(52) U.S. Cl.
CPC ............ *G06F 3/016* (2013.01); *G06F 3/0416* (2013.01); *G06F 2203/014* (2013.01)

(58) Field of Classification Search
None
See application file for complete search history.

(56) References Cited

U.S. PATENT DOCUMENTS 8,823,662 B2    9/2014  Aono
9,465,439 B2    10/2016 Shinozaki et al.
(Continued)

FOREIGN PATENT DOCUMENTS

EP    2 472 368 A1    7/2012
JP    H09-178472 A    7/1997
(Continued)

OTHER PUBLICATIONS

Extended European Search Report (EESR) dated May 18, 2017, from corresponding EP Appl No. 14857388.4, 12 pp.
(Continued)

*Primary Examiner* — Jose Soto Lopez
(74) *Attorney, Agent, or Firm* — Studebaker & Brackett PC

(57) ABSTRACT

A tactile sensation providing apparatus includes a piezoelectric element 1, a detection unit 7 for detecting each pressing and releasing based on an output voltage of the piezoelectric element 1, a drive unit 4 for driving the piezoelectric element 1 synchronously with the detection of each pressing and releasing by the detection unit 7 and thereby providing a tactile sensation, a discharge unit 5 for discharging the piezoelectric element 1 after the driving of the piezoelectric element 1 before start of detection of next releasing or pressing, and a voltage fixing unit 11 for fixing, after the detection of the pressing or releasing by the detection unit 7 before the start of the detection of the next pressing or releasing, an input voltage of the detection unit 7 at a predetermined voltage.

4 Claims, 5 Drawing Sheets

(56) References Cited

U.S. PATENT DOCUMENTS

| | | | | |
|---|---|---|---|---|
| 9,588,585 | B2* | 3/2017 | Shinozaki | G06F 3/0488 |
| 2012/0154318 | A1* | 6/2012 | Aono | G06F 3/016 |
| | | | | 345/173 |
| 2012/0154330 | A1* | 6/2012 | Shimizu | G06F 3/016 |
| | | | | 345/174 |
| 2014/0039804 | A1* | 2/2014 | Park | A61B 5/0002 |
| | | | | 702/19 |
| 2015/0009164 | A1* | 1/2015 | Shinozaki | G06F 3/016 |
| | | | | 345/173 |
| 2015/0111558 | A1* | 4/2015 | Yang | G04G 21/04 |
| | | | | 455/418 |
| 2015/0293590 | A1* | 10/2015 | Lehtiniemi | G06F 3/016 |
| | | | | 715/702 |
| 2015/0326985 | A1* | 11/2015 | Priyantha | H04R 29/004 |
| | | | | 381/56 |
| 2016/0041620 | A1* | 2/2016 | Motoyama | G06F 3/017 |
| | | | | 345/156 |
| 2017/0212478 | A1* | 7/2017 | Basargin | G04G 9/0064 |

FOREIGN PATENT DOCUMENTS

| | | |
|---|---|---|
| JP | 2011-048692 A | 3/2011 |
| JP | 2011-048696 A | 3/2011 |
| JP | 4672075 B2 | 4/2011 |
| WO | 2013/105516 A1 | 7/2013 |

OTHER PUBLICATIONS

An Office Action; "Notice of Reasons for Rejection," issued by the Japanese Patent Office dated Sep. 20, 2016, which corresponds to Japanese Patent Application No. 2015-544773 and is related to U.S. Appl. No. 15/031,817; with English language statement of relevance.

International Search Report, PCT/JP2014/004941 dated Nov. 18, 2014.

Written Opinion of the International Searching Authority with Concise Explanation, PCT/JP2014/004941, dated Nov. 18, 2014.

* cited by examiner

TACTILE SENSATION PROVIDING APPARATUS AND CONTROL METHOD OF TACTILE SENSATION PROVIDING APPARATUS

CROSS REFERENCE TO RELATED APPLICATION

This application claims priority to and the benefit of Japanese Patent Application No. 2013-223276 filed on Oct. 28, 2013, the entire contents of which are incorporated herein by reference.

TECHNICAL FIELD

The present invention relates to tactile sensation providing apparatus and a control method of the tactile sensation providing apparatus.

BACKGROUND ART

Conventionally, there has been known a technique to provide, on a contacted surface such as a touch panel, a realistic tactile sensation to a contact object such as a finger (for example, see PLT 1). In the technology disclosed in the PLT 1, a piezoelectric element is commonly used as a load sensor for detecting pressing (depression) to the contacted surface and also as an actuator for vibrating the contacted surface. When the piezoelectric element functions as the load sensor and detects a predetermined load (output voltage) generated by a pressing operation of the contact object to the contacted surface, the piezoelectric element is controlled to function as the actuator for a predetermined period of time and to vibrate the contacted surface. Similarly, upon detection of the predetermined output voltage generated by a releasing operation of the contact object from the contacted surface, the piezoelectric element is controlled to function as the actuator for a predetermined period of time and to vibrate the contacted surface.

CITATION LIST

Patent Literature

PLT 1: JP4672075B2

SUMMARY

Technical Problem

Incidentally, the piezoelectric element is known to have characteristics called dielectric absorption (dielectric hysteresis) in which the piezoelectric element presents a voltage even when the piezoelectric element is discharged after vibrated upon application of the voltage. Therefore, in order to reliably provide the tactile sensation at the time of pressing/releasing by using the piezoelectric element as the load sensor and also as the actuator, the dielectric absorption needs to be taken into consideration.

In view of the above aspects, it could be helpful to provide a tactile sensation providing apparatus and a control method of the tactile sensation providing apparatus that have a simple configuration and are capable of, without being affected by the dielectric absorption of the piezoelectric element, reliably detecting the pressing/releasing and providing the tactile sensation.

Solution to Problem

In order to achieve the above object, a tactile sensation providing apparatus includes:
- a piezoelectric element;
- a detection unit for detecting each pressing and releasing based on an output voltage of the piezoelectric element;
- a drive unit for driving the piezoelectric element synchronously with the detection of each pressing and releasing by the detection unit and thereby providing a tactile sensation;
- a discharge unit for discharging the piezoelectric element after the driving of the piezoelectric element before start of detection of next releasing or pressing; and
- a voltage fixing unit for fixing an input voltage of the detection unit at a predetermined voltage after the detection of the pressing or releasing by the detection unit before the start of the detection of the next releasing or pressing.

In order to achieve the above object, further, a control method of a tactile sensation providing apparatus having
- a piezoelectric element,
- a detection unit for detecting each pressing and releasing based on an output voltage of the piezoelectric element,
- a drive unit for driving the piezoelectric element synchronously with the detection of each pressing and releasing by the detection unit and thereby providing a tactile sensation,
- a discharge unit for discharging the piezoelectric element after the driving of the piezoelectric element before start of detection of next releasing or pressing, and
- a voltage fixing unit for fixing an input voltage of the detection unit at a predetermined voltage, the control method includes:
- after the detection of the pressing or releasing by the detection unit before the start of the detection of the next releasing or pressing, fixing the input voltage of the detection unit at the predetermined voltage by the voltage fixing unit.

Advantageous Effect

According to the disclosure herein, the tactile sensation may be provided by reliably detecting pressing/releasing with a simple structure without being affected by dielectric absorption of the piezoelectric element.

DETAILED DESCRIPTION

First, prior to a description of one embodiment, a tactile sensation providing apparatus which the inventor has previously developed will be described.

Figure 1:
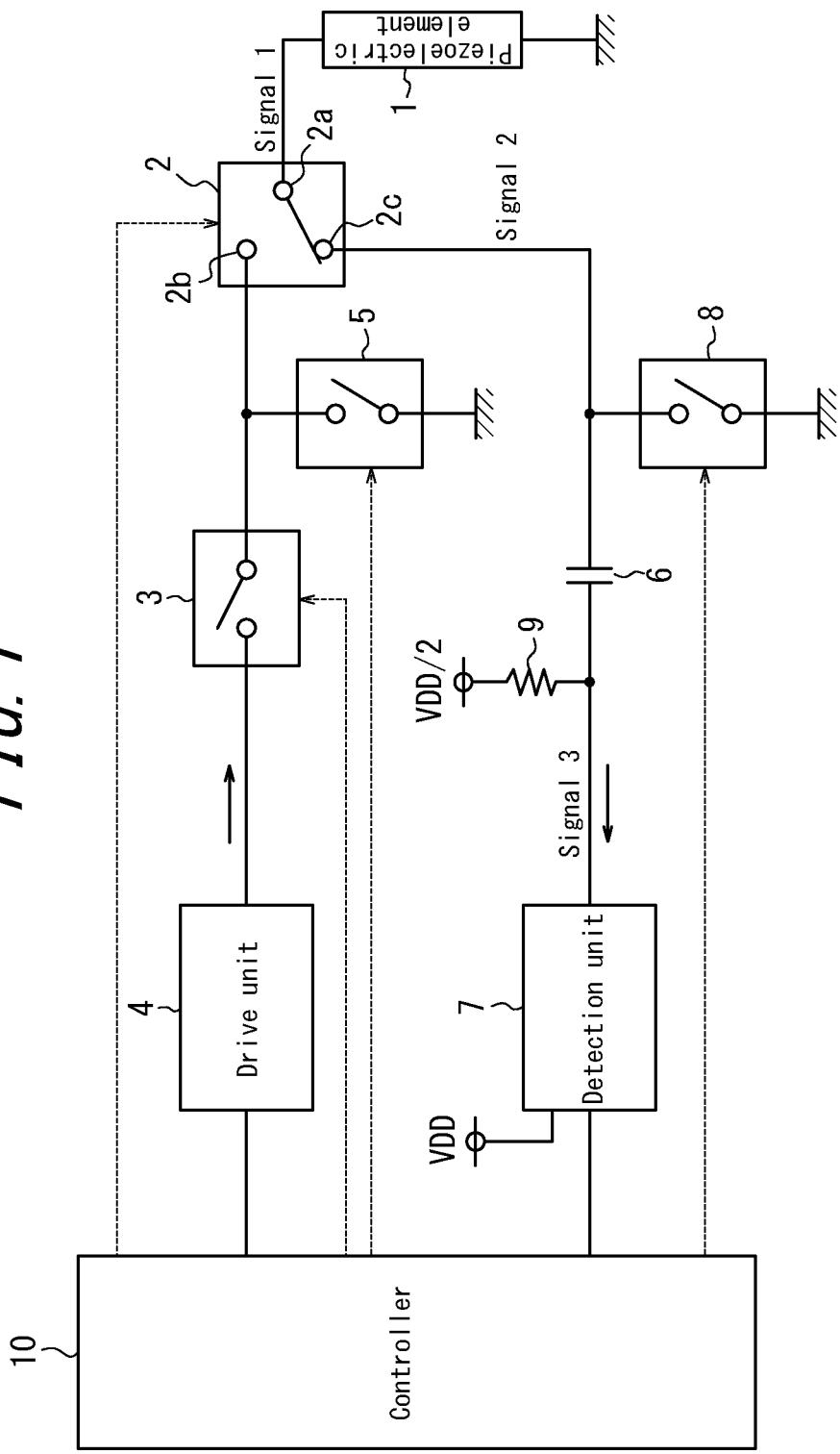
FIG. 1 is a circuit diagram illustrating an example of a schematic structure of a tactile sensation providing apparatus.

FIG. 1 is a circuit diagram illustrating a schematic structure of an example of the tactile providing apparatus which the inventor has previously developed. In FIG. 1, a piezoelectric element 1 functions as a load sensor for detecting pressing (pressure) on a contacted surface (not shown) and also as an actuator for providing a tactile sensation by vibrating the contacted surface. The piezoelectric element 1 has one electrode connected to a common contact 2a of a changeover switch 2 and the other electrode earthed. The changeover switch 2 has two changeover contacts 2b and 2c.

The changeover contact 2b is connected to a drive unit 4 via a drive switch 3 and, simultaneously, earthed via a discharge switch 5 that constitutes a discharge unit. The drive unit 4 is configured to output a drive signal having predetermined waveform, frequency and amplitude (e.g., several 10 V) that correspond to a tactile sensation to be provided. On the other hand, the changeover contact 2c is connected to a detection unit 7 via a capacitor 6 used for DC blocking and, simultaneously, earthed via a reset switch 8. The detection unit 7 includes an AD converter for converting an analog input voltage into a digital signal and is configured to detect pressing or releasing by detecting a change in the AC converted signal, i.e., a change in a signal equivalent to a change in a voltage of, for example, several 100 mV. To an input terminal of the detection unit 7, a predetermined voltage (a reference voltage) is applied via a pull-up resistor 9. The reference voltage is set to, for example, VDD/2 when a power supply voltage of the AD converter is represented by VDD.

The drive unit 4 and the detection unit 7 are connected to a controller 10 and controlled thereby. Also, the changeover switch 2, the drive switch 3, the discharge switch 5, and the reset switch 8 are constituted by using a semiconductor switch such as, for example, an FET and controlled by the controller 10. For example, in the changeover switch 2, the switchover contact 2c is connected to the common contact 2a when the control signal from the controller 10 is at a low (L) level, while the switchover contact 2b is connected to the common contact 2a when the control signal is at a high (H) level. Further, the drive switch 3, the discharge switch 5, and the reset switch 8 are open (OFF) when the control signal from the controller 10 is at the L level and close (ON) when the control signal is at the H level. Note that the drive unit 4 and the detection unit 7 may be incorporated in the controller 10.

Figure 2:
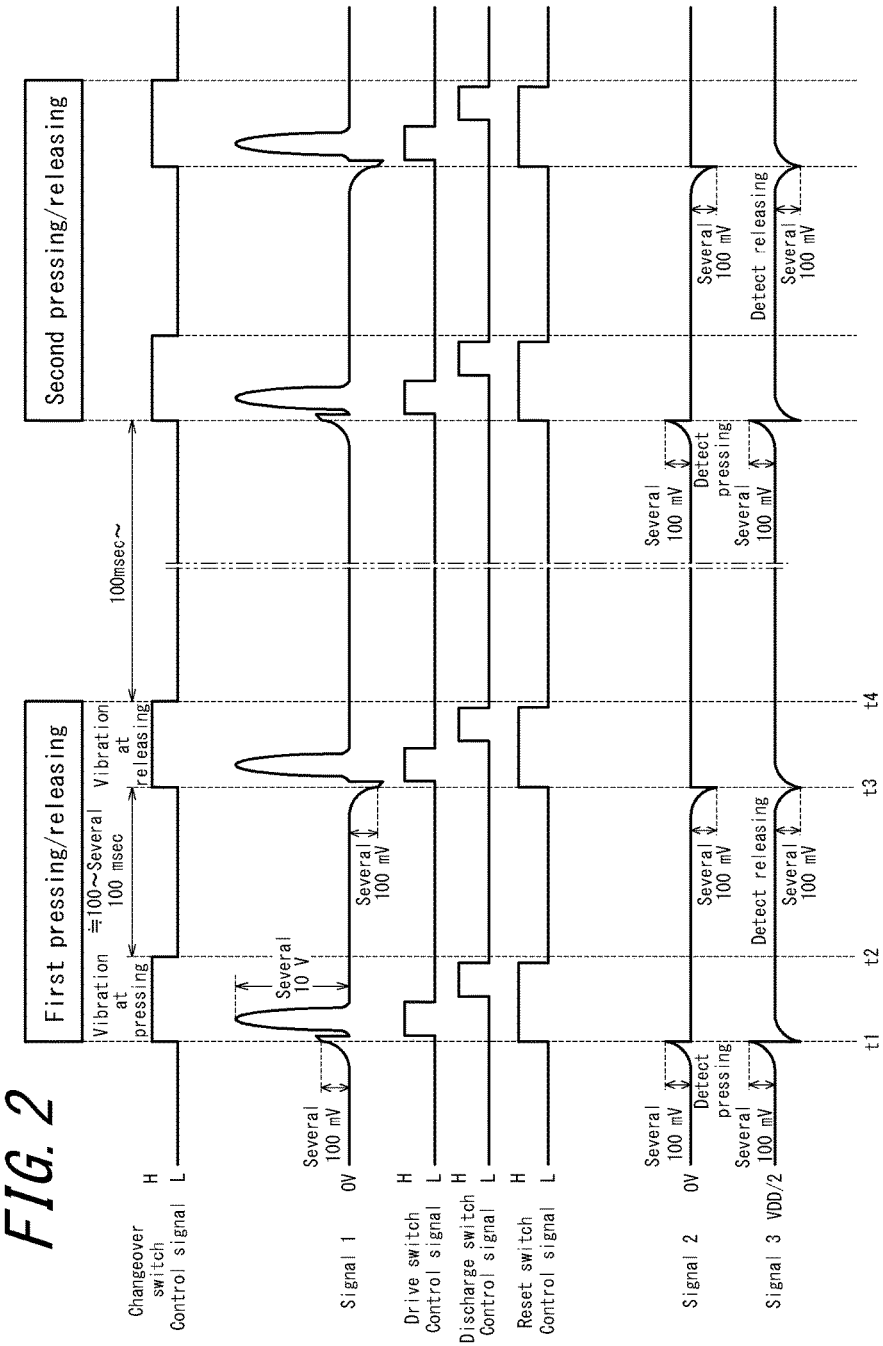
FIG. 2 is a timing chart illustrating operations of the tactile sensation providing apparatus of FIG. 1.

FIG. 2 is a timing chart illustrating operations of the tactile sensation providing apparatus illustrated in FIG. 1 that does not take dielectric absorption of the piezoelectric element 1 into consideration. In FIG. 2, a signal 1 represents a terminal voltage of the piezoelectric element 1. A signal 2 represents a voltage of the switchover contact 2c. A signal 3 represents an input voltage of the detection unit 7. The controller 10 normally sets respective control signals of the changeover switch 2, the drive switch 3, the discharge switch 5, and the reset switch 8 to the L level and controls the detection unit 7 to monitor an output voltage of the piezoelectric element 1. When the detection unit 7 detects pressing on the contacted surface by a contact object at time t1, the controller 10 sets the respective control signals of the changeover switch 2 and the reset switch 8 to the H level. The detection unit 7 detects the pressing when detecting an increase in the signal 3 by, for example, several 100 mV relative to the reference voltage.

When the pressing is detected, the controller 10 sets the control signal of the drive switch 3 to the H level for a predetermined period of time, during which the drive unit 4 applies a drive signal with predetermined frequency and amplitude to the piezoelectric element 1 via the drive switch 3 and the changeover switch 2. Thereby, the piezoelectric element 1 is vibrated and provides a tactile sensation. FIG. 2 illustrates an example in which a drive signal of a sine wave at the predetermined frequency with the amplitude of several 10 V is applied to the piezoelectric element 1 for a half cycle. Subsequently, the controller 10 sets the control signal of the drive switch 3 to the L level and then control signal of the discharge switch 5 to the H level for the predetermined period of time. Thereby, charge stored in the piezoelectric element 1 is discharged via the changeover switch 2 and the discharge switch 5.

Next, the controller 10 sets the respective control signals of the discharge switch 5 and the reset switch 8 to the L level and, at time t2, sets the control signal of the changeover switch 2 to the L level and controls the detection unit 7 to start monitoring the output voltage of the piezoelectric element 1. Then, when the detection unit 7 detects releasing of the contact object from the contacted surface at time t3, the controller 10 sets the respective control signals of the changeover switch 2 and the reset switch 8 to the H level and controls each unit in a manner similar to that for the detection of the pressing as described above such that the tactile sensation is provided. Then, the controller 10, at time t4, controls the detection unit 7 to start monitoring the output voltage of the piezoelectric element 1. The detection unit 7 detects the releasing when detecting a decrease in the signal 3 by, for example, several 100 mV relative to the reference voltage. Thereafter, by carrying out similar operations, the controller 10 detects next pressing/releasing and provides the tactile sensation at each time of the detection.

The tactile sensation providing apparatus illustrated in FIG. 1 includes the discharge switch 5 and, after driving the piezoelectric element 1, turns the discharge switch 5 on so as to discharge the piezoelectric element 1. The tactile sensation providing apparatus also includes the reset switch 8 and, prior to the monitoring of the output voltage of the piezoelectric element 1 by the detection unit 7, resets the capacitor 6. Therefore, even when the piezoelectric element 1 is sequentially driven, a gradual increase in the input voltage of the detection unit 7 (the signal 3) caused each time the piezoelectric element 1 is driven may be prevented. Therefore, even when the pressing/releasing is continuously iterated, the pressing/releasing may be detected.

Figure 3:
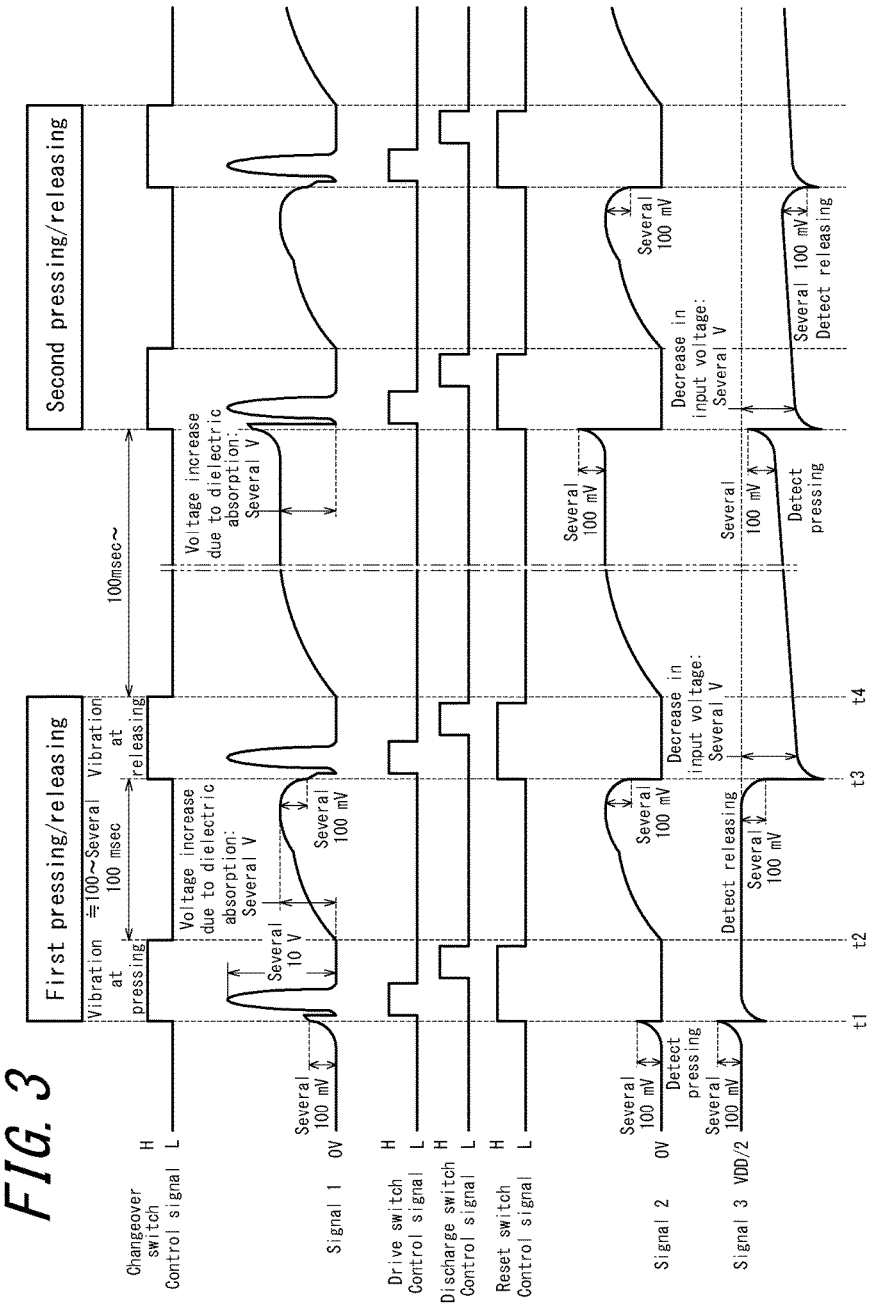
FIG. 3 is an explanatory view of a problem to be solved by the disclosure herein.

In practice, however, the piezoelectric element 1 has the dielectric absorption. Therefore, regardless of the discharging operation of the piezoelectric element 1 after the driving thereof, the output voltage of the piezoelectric element 1 thereafter during the voltage monitoring by the detection unit 7 changes as illustrated in FIG. 3. That is, the output voltage of the piezoelectric element 1 gradually increases from the start of the voltage monitoring and, after, for example, 200 msec to 300 msec, reaches approximately several V, for example. Therefore, after the piezoelectric element 1 is driven in response to the detection of the first pressing (first pressing detection) at the time t1, when the reset switch 8 is turned on in response to the detection of the releasing at the time t3 (first releasing detection), the input voltage (the signal 3) of the detection unit 7 significantly decreases from the reference voltage relative to the change in the voltage at the detection of the releasing and then gradually increases toward the reference voltage. As a result, after the time t4, the signal 3 when the detection unit 7 starts monitoring the voltage becomes lower than the reference voltage.

This phenomenon occurs due to a sharp decrease in the voltage when the signal 2 increased by the dielectric absorption is reset and, following the decrease in the voltage, the signal 3 also decreases via the capacitor 6 by the same voltage. Note that a change in the signal 3 after the driving of the piezoelectric element 1 in response to the first pressing is cut off by the capacitor 6 due to the increase in the signal 2 caused by the dielectric absorption for several 100 msec. As a result, the signal 3 is maintained at the reference voltage until the releasing causes a change in the voltage.

Therefore, at the detection of second and subsequent pressing/releasing, the decrease in the input voltage of the detection unit 7 due to the dielectric absorption needs to be taken into consideration. However, the decrease in the input voltage due to the dielectric absorption varies depending on operation timings of the pressing/releasing and the like. Further, at the pressing/releasing, it is necessary to detect, with respect to a voltage fluctuation of several V due to the dielectric absorption, a change in the voltage as small as several 100 mV. Therefore, the detection of the pressing/releasing while taking an impact of the voltage fluctuation of the signal 3 due to the dielectric absorption into consideration may render software processing troublesome by increasing the number thereof and, also, cause an erroneous detection.

The disclosure herein intends to solve such problems and provide a tactile sensation providing apparatus and a control method therefor that have a simple configuration and are capable of, without being affected by the dielectric absorption of the piezoelectric element, reliably detecting the pressing/releasing and providing the tactile sensation.

Figure 4:
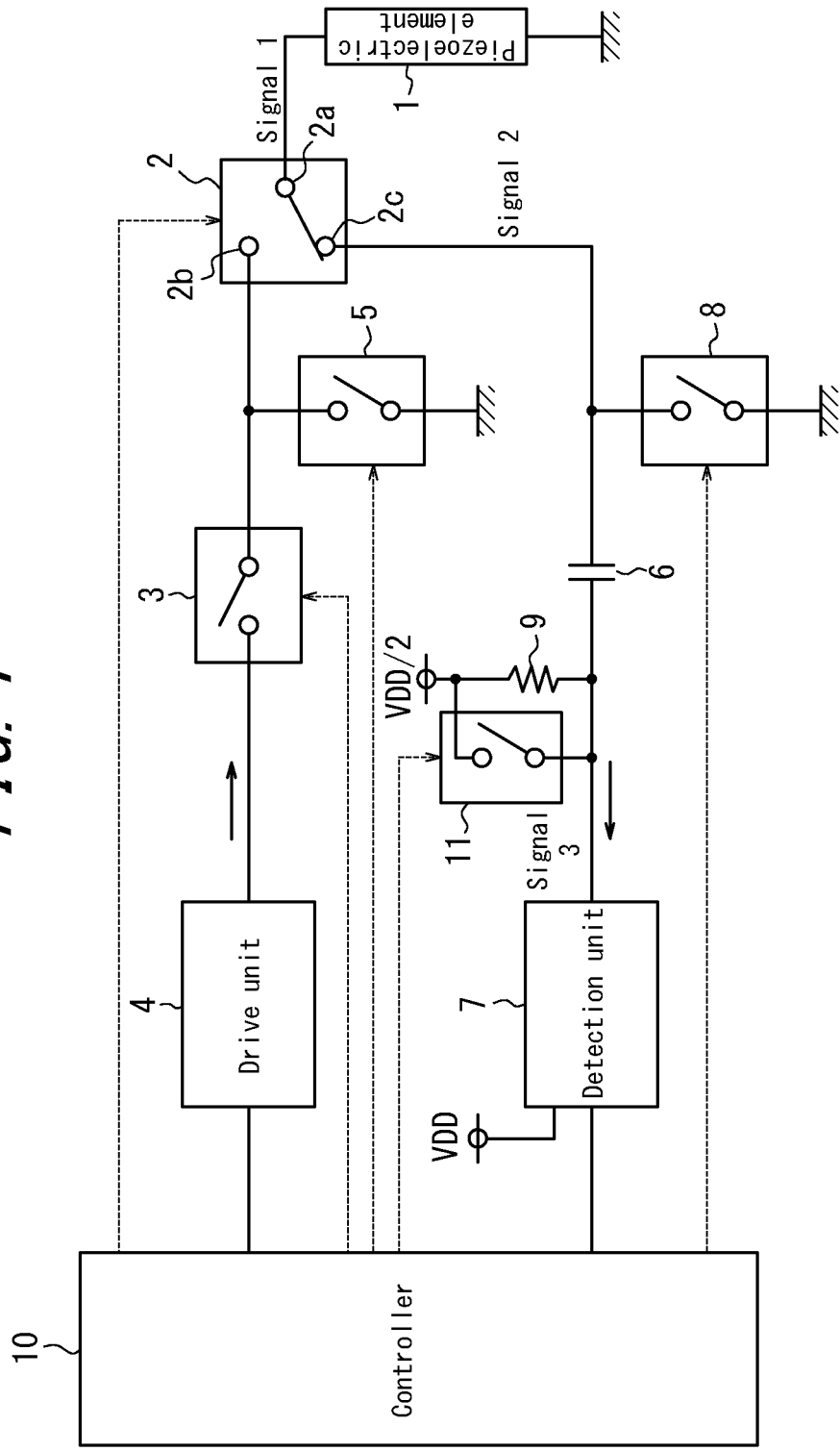
FIG. 4 is a circuit diagram illustrating a schematic structure of a tactile sensation providing apparatus according to one embodiment.

FIG. 4 is a circuit diagram illustrating a schematic configuration of a tactile sensation providing apparatus according to one embodiment. The tactile sensation providing apparatus of the present embodiment includes the circuit configuration illustrated in FIG. 1 having a voltage application switch 11 in parallel connection with the pull-up resistor 9 connected to the input terminal of the detection unit 7. The voltage application switch 11 constitutes a voltage fixing unit and is constituted by using, similarly to other switches, the semiconductor switch such as the FET so as to be turned off in response to the control signal at the L level from the controller 10 and to be turned on in response to the control signal at the H level. Other configurations of the tactile sensation providing apparatus is similar to that of FIG. 1.

Figure 5:
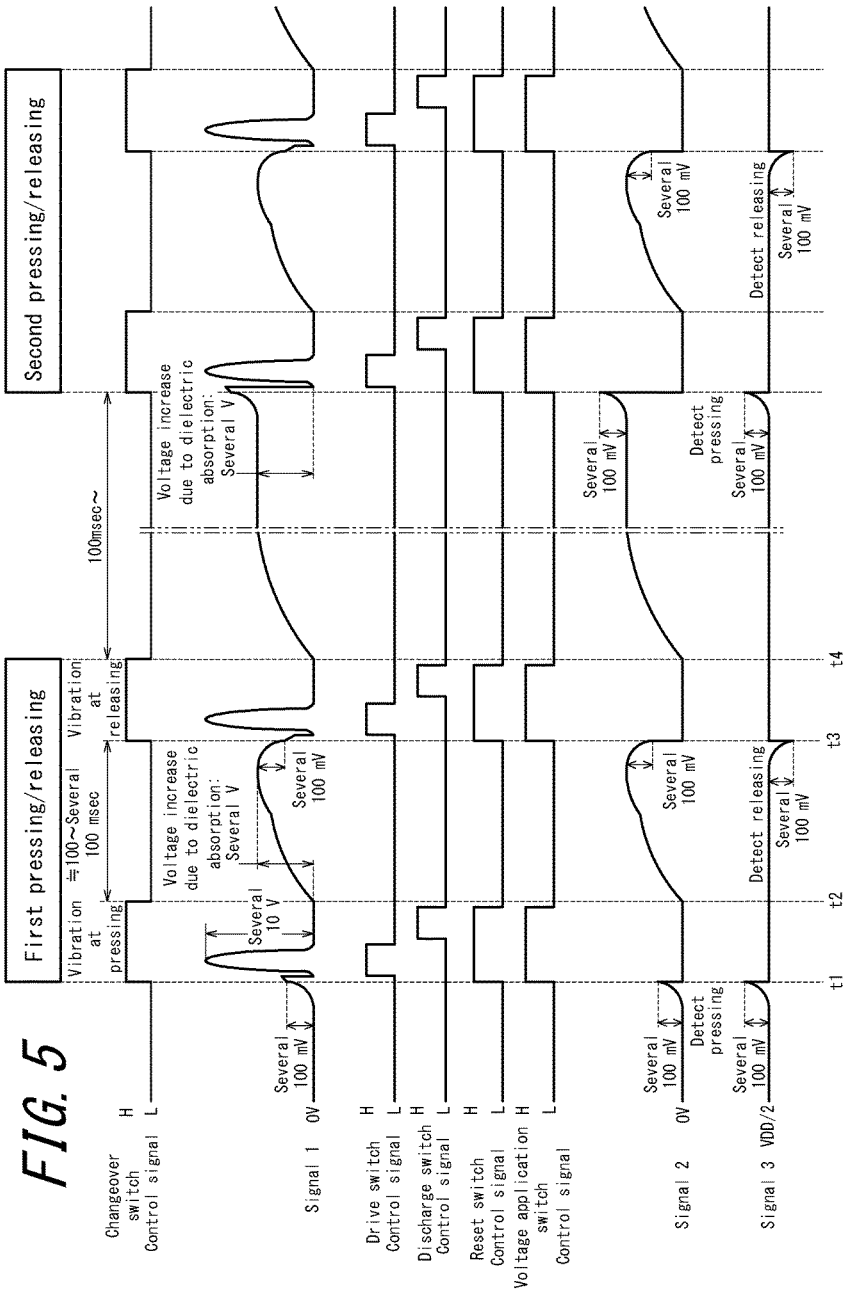
FIG. 5 is a timing chart illustrating an example of operations of the tactile sensation providing apparatus of FIG. 4.

FIG. 5 is a timing chart illustrating an examples of operations of the tactile sensation providing apparatus of FIG. 4. In the example of operations illustrated in FIG. 5, the voltage application switch 11 is turned on/off at the same timing as the reset switch 8. Therefore, when the reset switch 8 and the voltage application switch 11 are turned on at the time t3 at which the first releasing is detected, the reference voltage (for example, the VDD/2) is directly applied to the input terminal of the detection unit 7, i.e., one of the electrodes of the capacitor 6, and the other electrode of the capacitor 6 is earthed via the reset switch 8.

Thus, at time t3, even when the signal 2 increases due to the dielectric absorption of the piezoelectric element 1, the input voltage (the signal 3) of the detection unit 7 is fixed (held) at the reference voltage by the direct application of the reference voltage. At the time t4, as a result, the signal 3 is at the reference voltage when the detection unit 7 starts monitoring the voltage, allowing the detection of the second pressing based on a change in the signal 3 from the reference voltage. The second releasing and subsequent pressing/releasing may be also detected in a similar manner based on the change in the signal 3 from the reference voltage.

As described above, the tactile sensation providing apparatus according to the present embodiment, after the detection of the pressing or releasing by the detection unit 7 before the start of the detection of the next releasing or pressing, the voltage application switch 11 and the reset switch 8 are turned on and the input voltage (the signal 3) of the detection unit 7 is fixed at the reference voltage (e.g., the VDD/2). Accordingly, without increasing the software processing, a simple configuration may be achieved that is capable of, without being affected by the dielectric absorption of the piezoelectric element 1, reliably detecting the pressing/releasing and providing the tactile sensation.

Note that the disclosure herein is not limited to the above embodiment but may be varied or modified in numerous manners. For example, the voltage application switch 11 does not necessarily need to be turned on/off at the same timing as the reset switch 8 but may be turned on while the reset switch 8 is ON. Also, the discharge switch 5 may be connected between the common contact 2a of the changeover switch 2 and one of the electrodes of the piezoelectric element 1. In this case, for example, the piezoelectric element 1 is discharged after being driven while being connected to the changeover contact 2b of the changeover switch 2, and the changeover switch 2 is connected to the changeover contact 2c and the voltage application switch 11 is turned on while the discharge switch 5 is on. Thereby, the reset switch 8 may be omitted.

Further, although the above embodiment discloses a configuration having various modules and/or units for performing specific functions, these modules and/or units are schematically illustrated to explain functionalities thereof and do not necessarily illustrate specific hardware and/or software. In that sense, these modules, units, and other components may be any hardware and/or software implemented to substantially perform the specific functions described herein. Various functions of the respective components may be achieved by the hardware and/or the software combined or separated in any manners, and these separated or combined hardware and/or software may be used separately or in any combination thereof. In this way, various aspects of the disclosure herein may be carried out in numerous different modes, and therefore all of those modes are included in the scope of the disclosure herein.

REFERENCE SIGNS LIST 1 piezoelectric element
2 changeover switch
3 drive switch
4 drive unit
5 discharge switch
6 capacitor
7 detection unit
8 reset switch
9 pull-up resistor
10 controller
11 voltage application switch

The invention claimed is:

1. A tactile sensation providing apparatus comprising:
   a piezoelectric element;
   a detection unit for detecting each pressing and releasing based on an output voltage of the piezoelectric element at an input terminal of the detection unit;
   a drive unit for driving the piezoelectric element synchronously with the detection of each pressing and releasing by the detection unit and thereby providing a tactile sensation;

a discharge unit for discharging the piezoelectric element after the driving of the piezoelectric element before start of detection of next releasing or pressing; and a voltage fixing unit for fixing a voltage at the input terminal of the detection unit at a non-zero predetermined voltage after the detection of the pressing or releasing by the detection unit before the start of the detection of the next releasing or pressing.

2. A control method of a tactile sensation providing apparatus having a piezoelectric element, a detection unit for detecting each pressing and releasing based on an output voltage of the piezoelectric element at an input terminal of the detection unit, a drive unit for driving the piezoelectric element synchronously with the detection of each pressing and releasing by the detection unit and thus providing a tactile sensation, a discharge unit for discharging the piezoelectric element after the driving of the piezoelectric element before start of detection of next releasing or pressing, and a voltage fixing unit for fixing a voltage at the input terminal of the detection unit at a non-zero predetermined voltage, the control method comprising:

after the detection of the pressing or releasing by the detection unit before the start of the detection of the next releasing or pressing, fixing the input voltage of the detection unit at the non-zero predetermined voltage by the voltage fixing unit.

3. The control method of claim 2, wherein the predetermined voltage level is appreciably VDD/2, where VDD is a power supply level of the drive unit.

4. The tactile sensation providing apparatus of claim 1, wherein the predetermined voltage level is appreciably VDD/2, where VDD is a power supply level of the drive unit.

* * * * *